US010693959B2

(12) United States Patent
Peixoto Guimarães Ubirajara e Silva

(10) Patent No.: US 10,693,959 B2
(45) Date of Patent: Jun. 23, 2020

(54) RESIDENTIAL AUTOMATION SYSTEM, EQUIPMENT AND PROCESS THAT IS EASY TO INSTALL, CONFIGURE AND USE

(71) Applicant: SOMFY SAS, Cluses (FR)

(72) Inventor: Gabriel Peixoto Guimarães Ubirajara e Silva, Belo Horizonte MG (BR)

(73) Assignee: SOMFY SAS, Cluses (FR)

( * ) Notice: Subject to any disclaimer, the term of this patent is extended or adjusted under 35 U.S.C. 154(b) by 44 days.

(21) Appl. No.: 15/500,341

(22) PCT Filed: Aug. 1, 2014

(86) PCT No.: PCT/EP2014/066642
§ 371 (c)(1),
(2) Date: Jan. 30, 2017

(87) PCT Pub. No.: WO2015/158401
PCT Pub. Date: Oct. 22, 2015

(65) Prior Publication Data
US 2017/0201579 A1    Jul. 13, 2017

(51) Int. Cl.
*H04L 29/08* (2006.01)
*H04L 12/28* (2006.01)
(Continued)

(52) U.S. Cl.
CPC ........ *H04L 67/1095* (2013.01); *H04L 12/282* (2013.01); *H04L 12/2807* (2013.01);
(Continued)

(58) Field of Classification Search
CPC .............. G05B 19/0426; H04L 12/282; H04L 12/2821; H04L 12/28
See application file for complete search history.

(56) References Cited

U.S. PATENT DOCUMENTS

2005/0251500 A1* 11/2005 Vahalia ............... G06F 16/1774
2006/0161270 A1    7/2006 Luskin et al.
(Continued)

FOREIGN PATENT DOCUMENTS

BR    200506599 A2    5/2007
BR    200701330 A2    2/2009
(Continued)

OTHER PUBLICATIONS

International Search Report and Written Opinion dated Oct. 9, 2014 issued in corresponding application No. PCT/EP2014/066642; in English (10 pages).

*Primary Examiner* — Aftab N. Khan
(74) *Attorney, Agent, or Firm* — Westerman, Hattori, Daniels & Adrian, LLP

(57) ABSTRACT

In a residential automation system (100) including a terminal (101), a gateway (102), at least one remote controller (105) having at least one key and at least one peripheral device (104), a configuring method has a configuration step, performed by the terminal (101), including recognizing (E1) the gateway (102), the at least one remote controller (105) and the at least one peripheral device (104) and associating them; creating (E2) a configuration information including control commands involving the at least one peripheral device (104); and sharing the configuration information with the gateway (102) and with the at least one peripheral device (104). The associated gateway (102) and at least one peripheral device (104) are in constant synchronization with the terminal (101) during at least a part of the configuration step.

24 Claims, 5 Drawing Sheets

(51) Int. Cl.
*H05B 47/19* (2020.01)
*H04L 12/24* (2006.01)

(52) U.S. Cl.
CPC ...... *H04L 12/2832* (2013.01); *H04L 41/0806* (2013.01); *H04L 67/34* (2013.01); *H05B 47/19* (2020.01)

(56) References Cited

U.S. PATENT DOCUMENTS

2007/0185597 A1* 8/2007 Bejean .................. G08C 17/00
              700/83
2012/0299509 A1* 11/2012 Lee .................... H04L 41/0806
              315/291

FOREIGN PATENT DOCUMENTS

| | | |
|---|---|---|
| BR | 201106439 A2 | 8/2013 |
| WO | 2006/044816 A1 | 4/2006 |
| WO | 2013/017681 A2 | 2/2013 |
| WO | 2013/017681 A3 | 2/2013 |
| WO | WO-2013017681 A2 * | 2/2013 ......... G05B 19/0426 |

* cited by examiner

RESIDENTIAL AUTOMATION SYSTEM, EQUIPMENT AND PROCESS THAT IS EASY TO INSTALL, CONFIGURE AND USE

FIELD OF USE

This invention concerns a residential automation system. This invention also concerns a configuration process for the residential automation system.

PRIOR ART

Residential automation systems have previously been proposed. The prior art below discloses some systems and equipment.

The document BR201106439A2 "AUTOMATION EQUIPMENT FOR HOMES AND BUILDINGS WITH INTERNET-DISTRIBUTED SYSTEM" describes an internet-distributed system of automation equipment for homes and buildings comprising actuators, infra-red emitters, sensors and a gateway enabling the use of internet modems and computers so that the actuators, infra-red emitters and sensors can be interlinked to services available on the internet.

The document BR200701330A2 "INTEGRATED AUTOMATION SYSTEM FOR HOMES AND BUILDINGS" discloses an integrated automation system for homes and buildings. It describes an integrated device activating system that uses wireless data transmission standards, providing a data cabling infrastructure between a gateway and remote devices. The system is applicable in residential homes or in buildings, with the possibility of remote interaction via mobile phone, server and/or Internet.

In the document BR200506599A2 "ELECTRICAL RESIDENTIAL AND COMMERCIAL DISTRIBUTED WIRELESS AUTOMATION SYSTEMS", a central controller is described that provides residential and commercial automation for a large range of lights, devices, HVAC and other systems using a wireless distributed network. The central controller preferably employs a standard CPU and embedded operating system software. User graphic and audio interfaces may be incorporated. Harmonic distortion caused by non-linear AC charges are attenuated in monophase circuits by means of intelligent control of loads and/or the additional intelligent control of linear loads.

However, a significant factor limiting the commercial promotion of automated systems and equipment is that their installation, configuration and operation are complicated.

Thus, there is a demand for residential automation systems and equipment that are easier to install, configure and use than with the prior art known systems.

SUMMARY OF THE INVENTION

An objective of the invention is to enable association and data flow between elements of a residential automation system in a simplified way. In particular, the configuration process of the invention comprises steps during which the association of functionalities or groups of functionalities to different elements of the system is done mostly automatically, thereby dispensing with the need to customize and allocate functionalities to these elements individually in order to use them.

In a particular aspect, the process of the invention is for configuring a residential automation system comprising a terminal, a gateway, at least one remote controller having at least one key, and at least one peripheral device and said process comprises a configuration step, performed by the terminal, comprising the following steps:
  recognizing the gateway, the at least one remote controller and the at least one peripheral device and associating the gateway, the at least one remote controller and the at least one peripheral device;
  creating a configuration information comprising control commands involving the at least one peripheral device;
  sharing the configuration information with the gateway and with the at least one peripheral device involved;
the associated gateway and at least one peripheral device being in constant synchronisation with the terminal during at least a part of the configuration step.

Preferably, during the constant synchronisation with the terminal, the following steps are performed:
  the at least one peripheral device awaits messages from the gateway;
  the terminal sends configuration information to the gateway as soon as it is created,
  the gateway transmits systematically any received information from the terminal to the at least one peripheral device.

For example, the constant synchronisation is triggered during the recognizing step or by a powering step wherein the gateway is plugged into a source of energy.

In an embodiment, the recognizing step comprises a step of gathering data related to the at least one peripheral device and the at least one remote controller, the data comprises at least one of the following information:
  type of peripheral device or remote controller,
  available keys for the at least one remote controller, or channel options for the at least one peripheral device.

Further, the configuration information created during the creating step may be based on the data gathered during the recognizing step.

Preferably, the created configuration information is automatically associated to the at least one remote controller. The configuration step may comprise an automatic association between said at least one key and the created configuration information, the automatic association depending of a predefined rank of said configuration information in a list of configuration information. In this case, the at least one remote controller may adopt the form of a cube and four or five faces of the cube, each associated with a key, are automatically assigned to the respectively four or five first configuration information of the list.

The configuration information may take the form of a scenario.

The terminal may comprise a camera and the recognizing step comprises a step of reading of a visual code, such as a QR code, using the camera.

The process can comprise an exporting step wherein a visual code including gathered information regarding the created configuration information is generated, said generated visual code being readable by another terminal for copying the created configuration information.

According to an embodiment, the terminal acts as a master and the gateway, the at least one peripheral device, the at least one remote controller act as slaves and are unable to modify the configuration information.

Preferably, the terminal, the gateway, the at least one remote controller and the at least one peripheral device are all connected to a local network prior to the configuration step.

Another object of the invention is related to a residential automation system comprising a terminal, a gateway, at least one remote controller and at least one peripheral device, wherein the terminal, the gateway, the at least one remote controller and the at least one peripheral device are fitted with communication means to communicate with each other, and wherein the terminal comprises hardware and software means to implement the process as describe.

BRIEF DESCRIPTION OF THE INVENTION

This application will be more fully understood from the following detailed explanation, corresponding to the attached figures representing preferred embodiments. The different figures discussed below and the various embodiments described are used to explain the principles of this invention and are merely for illustrative purposes. It is specified that the principles of this invention may be applicable to any relevant type of equipment or system.

DESCRIPTION OF PREFERRED EMBODIMENTS OF THE INVENTION

Residential automation systems, also termed domotic systems, comprise peripheral devices such as lighting, curtains, blinds, air-conditioning, audio or video equipment, cameras and alarms that are fitted with controllable actuators or switches so as to be remotely managed upon requests from a user or automatic requests. The residential automatic systems also comprise remote controllers such as wireless remote controllers, keypads, switches, upon which a user can act to send control commands to the different peripheral devices of the residential automation system. Peripheral devices can be placed in living areas inside a building such as a home and/or outside in a proximate environment of a building.

The peripheral device is a device that executes the control commands. It acts as a "command executor".

A peripheral device may comprise one or a plurality of channels, or functionalities. For example a controlled dimmer can present an ON-OFF channel, a dimming channel, and/or a lamp colour channel. The status of these channels can be configured independently.

A remote controller generally sends control commands to the peripheral devices.

A keypad is a specific remote controller that can integrate peripheral devices, such as dimmers associated with lamps. A keypad can receive control commands from another remote controller. Thus, a keypad could also be considered at least partly as a peripheral device.

Thus, peripheral devices, respectively remote controllers, may be of different type, for example according to their functionalities.

Figure 1:
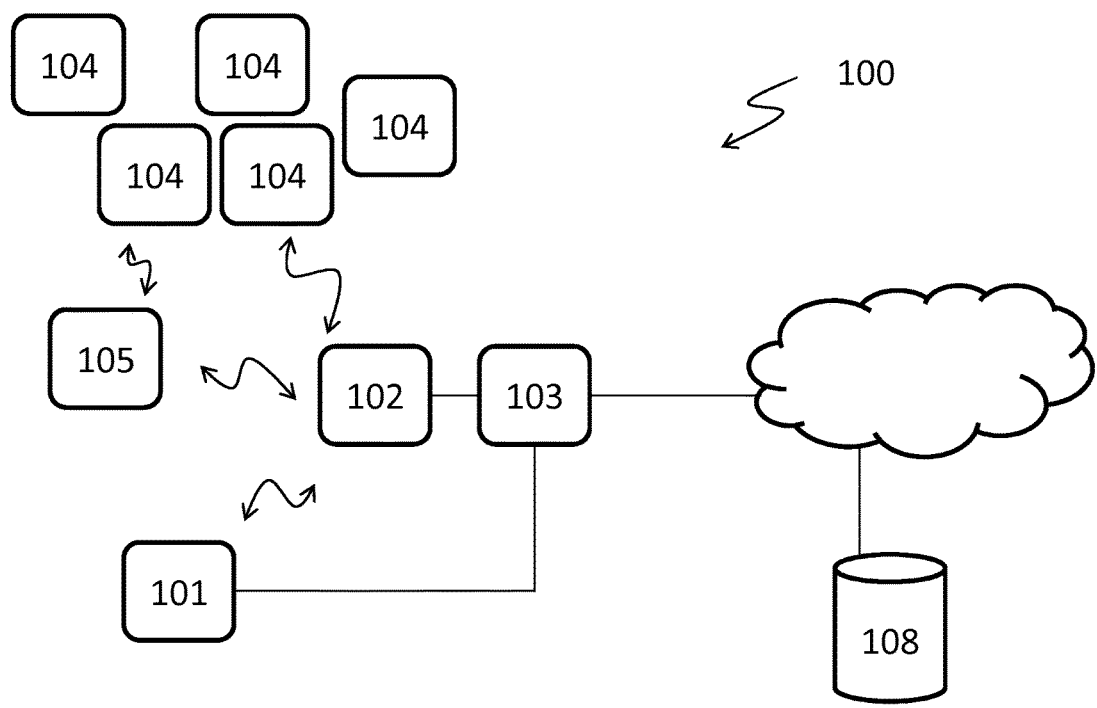
FIG. 1 is a schematic representation of the residential automation system of the invention.

As illustrated in FIG. 1, a residential automation system 100 can be controlled locally, using the remote controllers, but can also be controlled using a wide area network such as the Internet.

A residential automation system comprises a terminal 101. This terminal may comprise a data entry unit and a display unit. Both data entry unit and display unit can be combined, for example if the terminal is a smartphone or a tablet with a touch-sensitive screen. The terminal is used to enter control commands and to display a status of one or more automated pieces of equipment, such the peripheral devices in a use mode.

Preferably, the terminal 101 is also adapted to configure and control the residential automation controllable peripheral devices, in particular through scenarios or scenes, which correspond to a set of control commands given to different chosen pieces of equipment. Programming the scenes can be done using the data entry unit and a display unit of the terminal in a configuration mode.

Preferably, the residential automation system 100 also comprises a gateway 102, at least one remote controller 105 having at least one key, and at least one peripheral device 104. A key can be used to launch basic control commands or scenarios.

The gateway 102 is able to carry out exchange of data or control commands between the terminal 101, the peripheral device(s) 104, the remote controller(s), and eventually a router 103 connected to a wide area network 106 such as Internet. The terminal 101, the gateway 102, the peripheral device(s) 104 and the remote controller(s) may comprise communications interfaces, which may be of different types such as radiofrequency, Bluetooth and Ethernet. The router 103 may provide a communication interface between the gateway 102, eventually the terminal 101 and a server on the internet 108 through its wireless (Wi-Fi) and/or cabled (Ethernet) communication interfaces. The server 108 may comprise a computer and memory. The server can be physically remote from the residential automation system.

In another embodiment, the gateway 102 provides a communication interface between the terminal 101 and the peripheral device(s) 104 without any connection to a wide area network 106. For example, configuration of the associations and the scenarios is done locally, without any connection to a wide area network. Peripheral device(s) and gateway can use a different communication protocol than the protocol used between the terminal and the gateway.

In other words, the process can be executed locally or remotely, notably depending of available hardware and software.

It is furthermore specified that the local communications within the local network are preferably wireless communications, such as radiofrequency. In that case, the elements are easier to install. Remote controllers within the residential automation system also include a communication interface to communicate with the peripheral devices either directly or indirectly via the gateway.

The terminal 101 may be a smartphone, tablet, desktop or notebook, preferably fitted with a scanning camera and having dedicated hardware and software for configuring and operating the residential automation system. The terminal 101 may communicate with the router 103 by means of wireless (Wi-Fi) or Bluetooth communication.

The remote controller 105 can drive one or more peripheral device(s) 104 through the sending of control commands, which provoke a change of status of the concerned peripheral device(s) 104. The remote controller 105 can also initiate a scene or scenario, including several control commands sent to several peripheral devices so that their status is set to a preconfigured status.

Scenes can be launched by a user action using the key of any remote controller 105, including on the data entry unit of the terminal 101. They can also be launched automatically, without any user action, using a sensing unit, such as a timer, a programmed agenda, a weather sensor sensing for example an internal or external temperature, a luminance, or an air quality. Sensing units can be considered as remote controllers although they might not be actuated by a user. Sensing units can be integrated in a remote controller such as the terminal itself.

The residential automation system can comprise the at least one terminal 101, the gateway 102, at least one remote controller 105, and at least on peripheral device 104.

Figure 2:
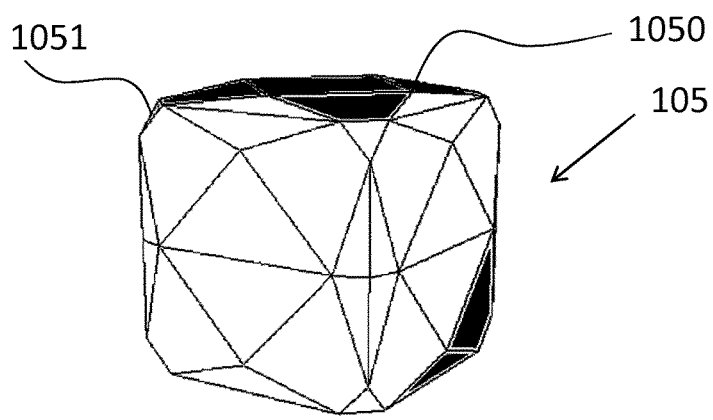
FIG. 2 is an example of remote controller used in the process.
Figure 3:
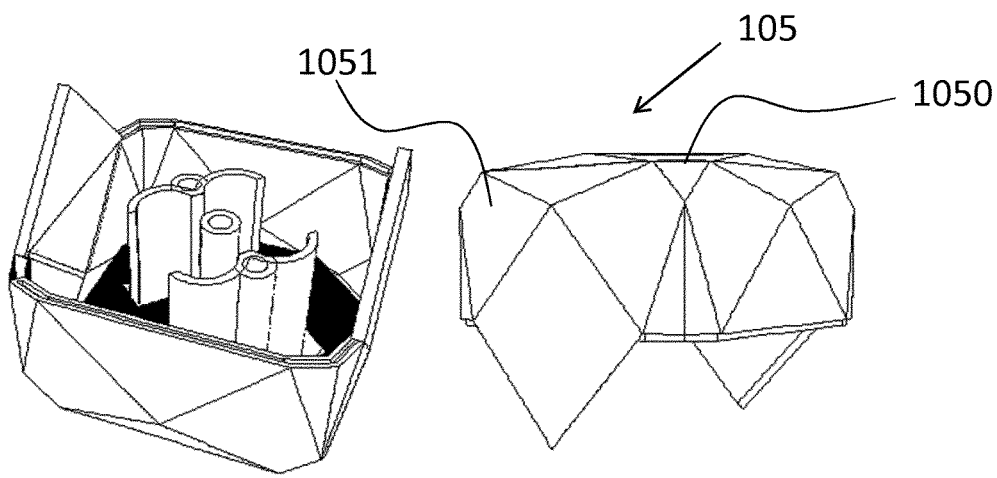
FIG. 3 is another view of FIG. 2 wherein the cube is open.

A particular remote controller 105 is shown on FIGS. 2 and 3. This remote controller 105 can be used for launching several scenarios or preconfigured control commands. It provides an interface between the user and the automation system 100 through the selection and positioning of one 1050 of its faces upwards. Each face of the remote controller 105 can be associated with a scenario comprising for example a set of control commands applicable to corresponding peripheral device(s) 104. In use, when a face associated with said scenario is positioned upwards, the remote controller 105 is able to detect which of its face is upward and it broadcasts the corresponding scenario number associated to the corresponding key (thus the broadcast scenario number can be received by any listening equipment such as peripheral devices, keypads, gateway, terminal) in order to forward the corresponding scenario to corresponding peripheral devices. In particular, the remote controller 105 may have at least 4 faces, such as a pyramid or a cube, consequently permitting at least 4 different scenarios/control commands to be sent to the peripheral devices 104. For this purpose, the remote controller 105 can comprise an inclination or acceleration sensing device, a microcontroller and a radiofrequency transmitter, thereby enabling it to identify the orientation of its faces against the terrestrial gravitational axis, to process this information and to send control commands by means of radiofrequency. Preferably, the faces are identified by symbols printed or carved on the faces, and individual orientation information can be send by the remote controller 105 when one face is positioned upwards. No other data entry means are necessary for the selection and sending of control commands, besides the act of positioning one of the faces upwards.

It can be said that the remote controller 105 having a cubic form comprises a plurality of keys. The faces of the cube define particular keys to be used to launch control commands. The remote controller 105 having the form of a control cube (FIGS. 2 and 3) provides an interface between the user and the peripheral device(s) 104 and makes it possible to control the peripheral device(s) 104 through the selection and positioning of one of its faces upwards.

Figure 7:
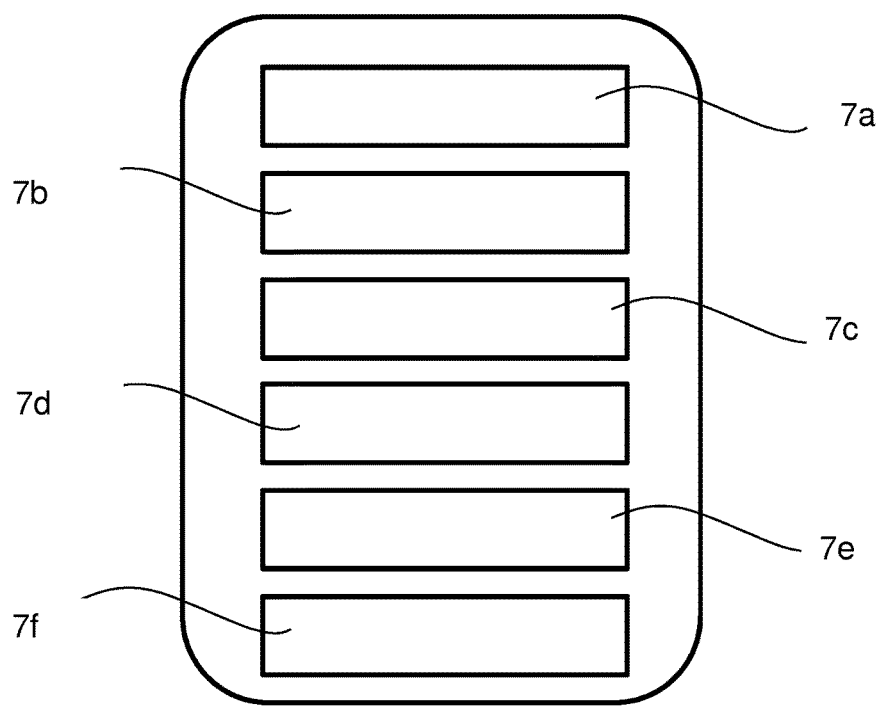
FIG. 7 represents another kind of remote controller with buttons.

Another type of remote controller 105 is represented on FIG. 7 and called keypad. This remote controller 105 comprises a set of entry keys (for example physical buttons 105a, 105b, 105c, 105d, 105e, 105f), which can be actuated separately by a user. Through the selection and actuation of one entry key, a scenario or control command information is sent to the peripheral devices. During the configuration step, after the remote controller 105 has been recognized, each entry key is automatically assigned to configured scenarios in a list on the terminal. In an example, the remote controller 105 is a six-key keypad. The first two keys are associated with integrated dimmers. The four remaining keys can be associated with scenarios configured from the terminal 101.

Still another type of remote controller 105 is the terminal itself, having a data entry unit and a display unit. The same terminal is thereby used for configuration and for command, locally and remotely through a wide area network.

The different types of remote controllers 105 may have monodirectional or bidirectional communication means, so that they are either able only to send control commands or able to receive and store configuration information as well as to send control commands. The remote controllers 105 do not need to store the whole set of control commands that are associated to a scenario, which are automatically stored by the peripheral devices. They only provide (broadcast) a scenario number to the peripheral devices, which react according to the scenario configured and learned and associated to this scenario number. The remote controllers may have means to display to a user that a scenario or control command has been sent or is being executed. For example, the remote controller 105 having a cubic form can have chamfered coins 1051 (FIGS. 2 and 3), accommodating electroluminescent diodes for a luminous feedback when a scenario is launched.

In order to set the residential automation system to operate, it is necessary to perform configuration steps. The simplicity offered by the configuration process according to the invention guarantees that this configuration process is adapted to the user needs and requirements.

The configuration process may be performed using the terminal and its data entry unit and display unit in a configuration mode.

Figure 8:
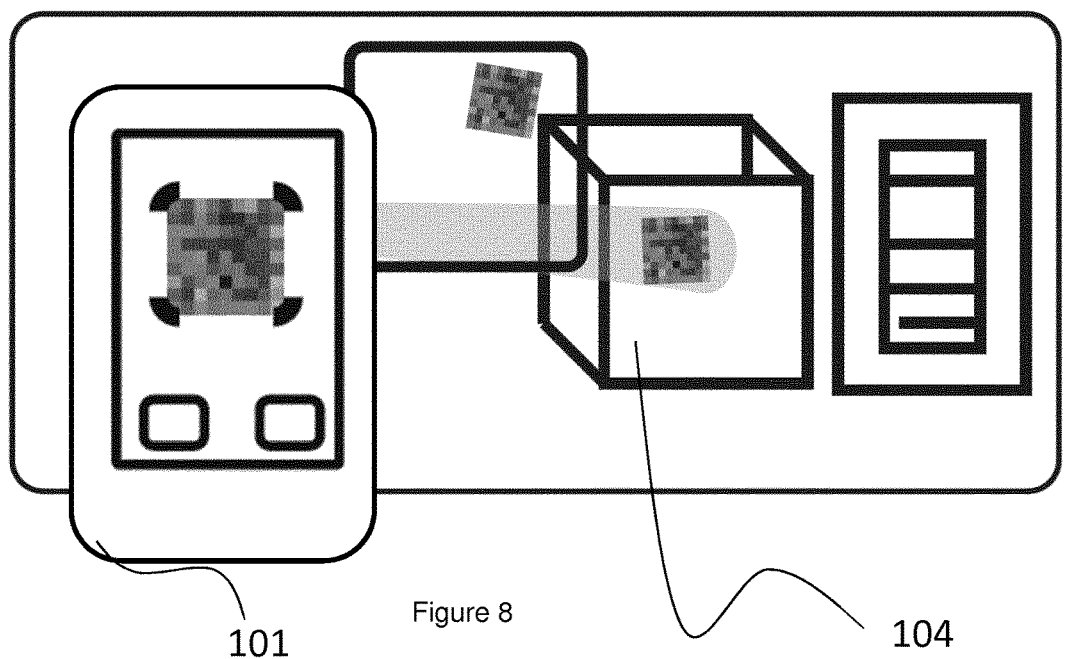
FIGS. 8 to 11 represent different screens of the terminal.

In order to carry out the process for residential automation configuration, said process comprises a configuration step, preferably performed by the terminal 101, which comprises a step in which the terminal 101 recognizes the gateway 102, each/the at least one remote controller 105 and each/the at least one peripheral device 104. Several methods can be implemented for this recognition step. Preferably, the gateway 102, each remote controller 105 and each peripheral device 104 exhibit a visual code under the form of a QR-code, including data relative to a unique identification code. In this case, the terminal 101 scans all visual codes using an integrated scanning camera. In other words, the terminal 101 can comprise a camera and the recognizing step comprises a step of reading of a visual code, such as QR-Code, using said camera (FIG. 8). Preferably, the visual code contains data relative to the different keys, properties, channels of the remote controllers or peripheral devices, that can be read and understood by the terminal. Next, the configuration step comprises a step of associating the gateway 102, the at least one (or each) remote controller 105 and the at least one (or each) peripheral device 104. This associating step may be performed automatically once the different elements are recognized. For example as seen on FIG. 4, the peripheral devices (step E1), and eventually the remote controller 105, are awaiting messages from the gateway 102. If the received configuration message is from the type "Associating", meaning that identification data should be saved or edited in a corresponding peripheral device 104, then each peripheral device receiving the "Associating" type message executes the association: identification data, such as identifiers, for example MAC (acronym for Media Access Control) addresses of the gateway 102 and of the remote controller 105 are thus saved by the peripheral devices. The same may apply to the remote controllers which save MAC addresses of the gateway 102 and of the peripheral device 104). After that, a feedback signal is eventually send to the gateway 102 before returning to the step where a message is awaiting. As the terminal broadcasts (via the gateway 102) the information scanned, the peripheral devices acquire knowledge about each other, and about the remote controllers to which they are associated. Another method could be implemented in which the terminal 101 broadcasts a request for identification and each element receiving and analysing this request answers and transmits its identification code. After the terminal 101 has received and retransmitted all identification codes according to the above-described associating step, the gateway 102, each remote controller 105 and each peripheral device 104 are automatically associated and can communicate with each other.

Preferably, the recognizing step comprises a step of gathering data related to the at least one peripheral device and the at least one remote controller, the data comprises at least one of the following information:
 type of peripheral device or remote controller,
 available keys for the at least one remote controller, or channel options for the at least one peripheral device.

Then the configuration information created during the creating step may be based on the data gathered during the recognizing step. The data may be comprised in the visual code This simple method for configuring and operating the system enables an automatic association of functionalities or groups of functionalities between peripheral device(s) 104, remote controller(s) 105 and the terminal 101. This method step allows the user to customize and attribute functionalities to these devices and equipment easily, without requiring any prior knowledge about how to configure a home automation installation.

The configuration step also comprises a step of creating configuration information using the available identification data of the gateway, each remote controller and each peripheral device .as well as a step of sharing the configuration information with the gateway 102 and with the at least one peripheral device 104 involved. The configuration information can also be saved in the terminal 101 in order to be used later.

In fact, the created configuration information can comprise control commands involving the at least one peripheral device 104. Preferably, this configuration information composes a scene or a scenario, i.e. a set of control commands to be sent to different peripheral devices for execution by these peripheral devices, or a single status to be sent to one peripheral device. For example, as seen on FIG. 5, the peripheral devices (step E2), and possibly the remote controller 105, are awaiting messages from the gateway 102. If the received configuration message is of the type "Command", corresponding to a specific configured command that should be saved in a corresponding peripheral device 104, then each peripheral device receiving the "Command" type message saves the configured command. The same may apply to the some remote controllers which also act as peripheral device 104. After that, a feedback is eventually sent to the gateway 102 before returning to the step where a message is awaiting. Here, the configured command takes the form of a status of the peripheral device or of a channel of a peripheral device 104, such as ON/OFF, or x % dimming level. A configured command may associate a status to each channel of the peripheral device. A configured command corresponds to the status that a peripheral device should adopt when it receives the corresponding control command.

Control commands can be ON/OFF commands as well as definite peripheral device status, such as dimming level. Control commands can also include audio/video control commands for TV, DVDs, etc.

Figure 6:
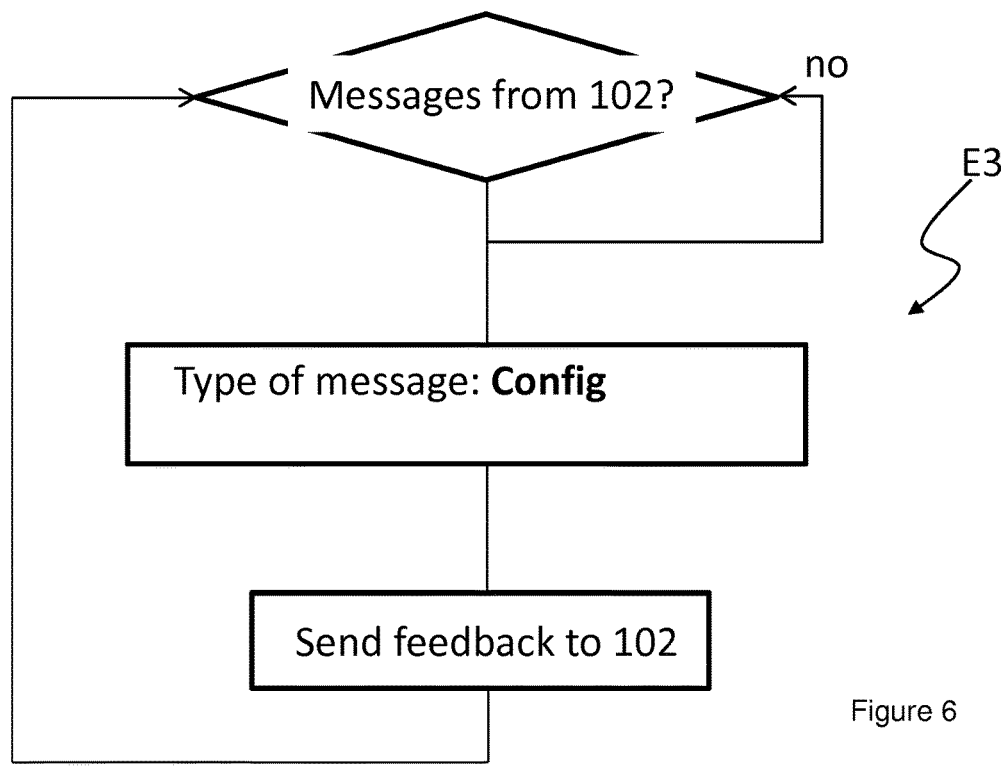

Another example is shown on FIG. 6. The peripheral device (step E3), and possibly the remote controller 105, are awaiting messages from the gateway 102. The received configuration message can also be of the type "Config", corresponding to a configuration of parameters. Each peripheral device receiving the "Config" type message changes and saves the configured parameters according to the content of the "Config" type message. The same may apply to the remote controllers. Here, the "Config" type message can take different forms:
 Configuration of key: changing and saving the scenario numbers that will be associated to keys of remote controllers; in other words, it may mean that the order of the scenarios in the list of scenarios changes, so that these scenarios are associated to different keys of the remote controllers.
 Configuration of channels: changing the basic properties of the peripheral device channels (for example from dimming level (0-100%) to ON/OFF, from white lamp colour to RGB lamp colour, type of controlled lamp like LED—Light Emitting Diode, incandescent lamp, etc., this information being saved in the peripheral device). In a use mode, if the peripheral device receives simple control commands, it will react according to the configuration of channels as set during this configuration step.
 Configuration of scenarios: saving the table of properties of the peripheral device channels in each scenario. During the synchronisation with the terminal and the gateway, the peripheral device learns and saves in a table the properties related to each of its channels for each scenario. These properties associated with a scenario may be different from the peripheral devices basic channels properties. In a use mode, when a scenario is launched, the peripheral device checks the table for the channel properties associated to this scenario and reacts accordingly.

The configured parameters are received and saved by the peripheral device or remote controller. After that, a feedback is eventually sent to the gateway 102 before returning on the step where a message is awaiting.

Preferably, at the beginning of the creating step, the terminal displays a list of possible configuration information or scenarios, some of them may be predefined or at least pre-named. The user is invited to go through this list and configure or modify the possible control commands in each scenario. The number of possible scenarios in the list could be adapted to the number of different remote controllers that have been identified during the recognizing step.

Preferably, these different steps are performed while there is a constant synchronisation, during at least a part of the configuration step, between the terminal 101 and the gateway 102, and between the gateway 102 and the peripheral devices 104, so that all share the information as soon as it is created.

In other words, the gateway 102 and the at least one peripheral device 104 (via the gateway) are in constant synchronisation with the terminal 101 during at least part of the configuration step so that the configuration information entered on the terminal is broadcast by the terminal 101 as soon as it is created, while the gateway and peripheral devices are in constant listening. This constant synchronisation enables the peripheral device(s) 104 to get the knowledge of the configuration made at the terminal. It enables the system to be configured and even used without any connection to the Internet. It also simplifies the actuation of the peripheral device(s) 104 using the remote controller(s) 105, as there is no need for repeating the set of control commands of a scene each time it is launched. The peripheral devices 104 know what they are expected to perform at the time a scenario is launched, for example at the time a scenario signal is broadcast. During a use mode, the peripheral devices, the terminal and the gateway also communicates to each other, however, the periodicity of listening to incoming messages (by the gateway or the peripheral devices) may be at least ten times less frequent than during the constant synchronization of the configuration mode.

Eventually, the configuration information is also shared with the at least one remote controller 105 such as a keypad acting partly as a peripheral device, and this remote controller 105 is in constant synchronisation with said terminal 101 so that the configuration information is shared by the terminal 101 to the remote controller 105 as soon as it is created.

Figure 4:
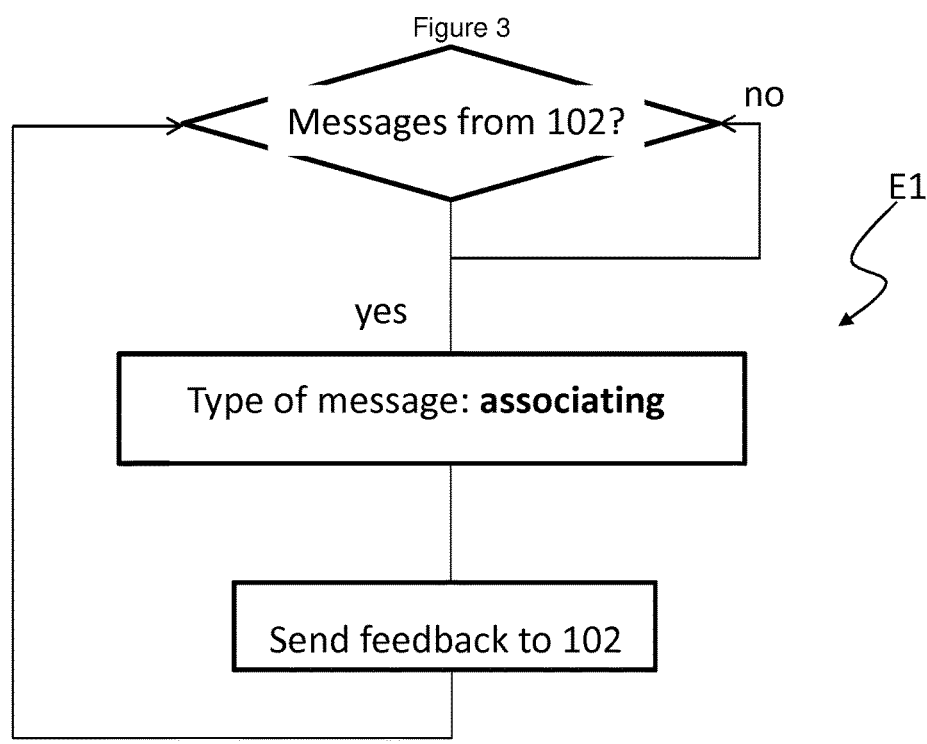
FIGS. 4 to 6 represent different steps of the process
Figure 5:
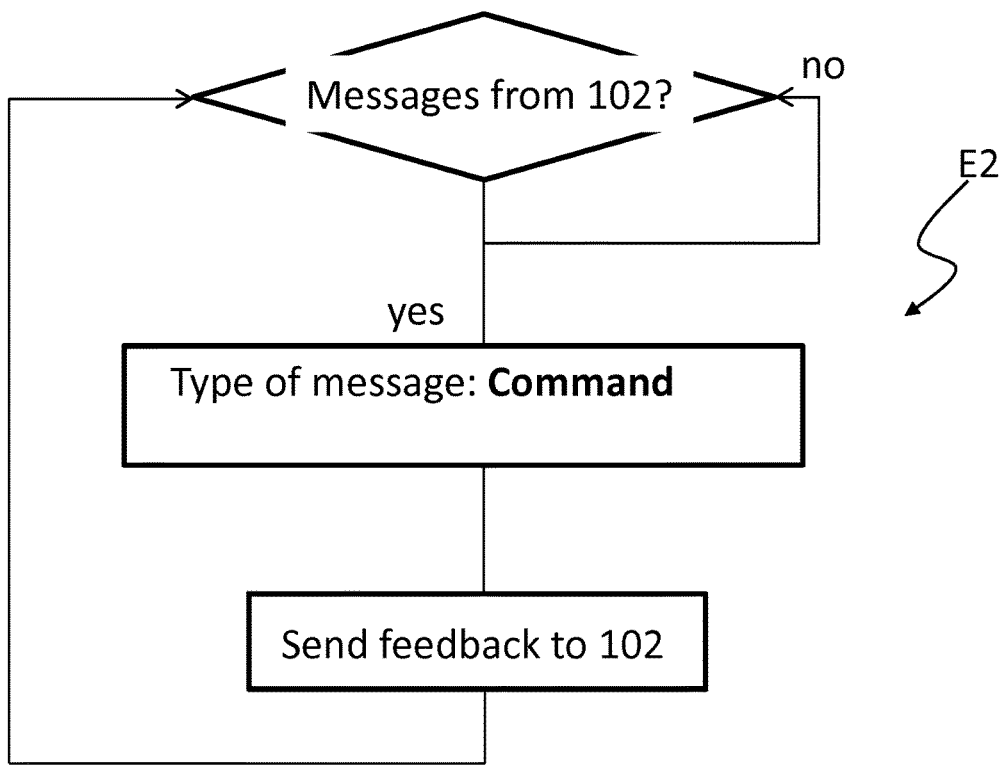

In other words, according to FIGS. 4 to 6, during the constant synchronisation with the terminal 101, the following steps may be performed: the at least one peripheral device 104 awaits messages from the gateway 102; the terminal 101 sends configuration information to the gateway 102 as soon as it is created; the gateway 102 transmits systematically any received information from the terminal 101 to the at least one peripheral device 104.

The automatic association of the scenarios to the different keys is also an important aspect of the simplified configuration. The user does not need to manually associate each key to one specific scenario. The automatic association is done as soon as the remote controller 105 is recognized and the configuration information is created using the terminal 101. During the configuration step, after the remote controller has been recognized, the faces are automatically assigned to the first configured scenarios in a list on the terminal. The same symbols that identify the different faces of the cubic remote controller are reproduced as pictograms on the interface of the terminal. For example, the scenario identified on the terminal by a cross pictogram will be automatically assigned to the remote controller face holding the similar cross symbol. The orientation of the remote controller faces may be learned during the recognizing step (for example the identification of faces is included in the visual code data) or are preferably predefined in the software means used by the terminal. The same can apply for the keypad keys associated to control commands or scenarios. Thus, it is only necessary to configure the list of scenarios on the terminal 101, since they are automatically assigned to the keys of the remote controllers that have been recognized at the beginning of the configuration process, for example thanks to the read visual code data, which includes information on the keys and on the different functionalities of these keys.

If the content of the configuration information is changed later when the terminal 101 is used, there is no need to manually intervene on the other elements that are designed to participate in the corresponding scenario. The constant synchronisation during the configuration step allows the changes made at the terminal to spread automatically to the other concerned elements of the system.

According to a specific embodiment, the created configuration information is automatically associated to the at least one remote controller 105. Preferably, in this embodiment, the process comprises an automatic association between said at least one key of the at least one remote controller and the created configuration information, the automatic association depending of a predefined rank of said configuration information in a list of configuration information. In this example, the at least one remote controller 105 may adopt the form of a cube and four or five faces of the cube are automatically assigned to the respectively four or five first configuration information of the list. The configured control command in a list may as well be automatically and respectively assigned to the first two keys of a keypad.

According to a specific embodiment, created configuration information takes into account the functionalities or channels of the peripheral devices recognized during the recognizing step. A scenario can be thus constructed giving a status to each or part of the channels of the peripheral devices concerned with the scenario.

Another specific implementation of the configuration process is the existence of a step-by-step tutorial, guiding the user through the configuration step.

The display unit of the terminal 101 can be used to display the explanation about the different successive tasks that have to be performed by the user in order to configure the installation.

For example, a first screen of the terminal 101 displays a login page, where the user has to enter identifiers such as an email address and/or a name and a password. After identification, a text screen (second screen) where information has to be read and acknowledged, is displayed and shown to the user.

Then, a third screen indicates that the gateway 102 should be plugged into a source of energy. Plugging the gateway 102 will cause said gateway to initiate contact with the terminal 101 using the appropriate communication protocols (for example Bluetooth). From this moment, terminal 105 and gateway 102 are able to exchange information and are in constant synchronisation with each other. Only after this second step is performed, a fourth screen is displayed. In other words, constant synchronisation may be triggered during the recognizing step or by a powering step wherein the gateway is plugged into a source of energy.

The fourth screen of the terminal 101 may contain text explaining how to install the remote controller(s) 105 next to the gateway 102, for example within a 20*m* distance to the gateway. A fifth screen explains that all remote controllers 105 of the installation have to be recognized at this stage. It may not be possible to recognize later new remote controllers 105, especially new cubes, without going through the entire step-by-step tutorial again.

In FIG. 8, a sixth screen represents a scanning tool for a visual code such as a QR code. User is invited to scan the QR code of all remote controllers 105 and all peripheral devices 104 one after the other, using the camera of the terminal 101. Each time a code is scanned, a seventh screen informs the user that the step has been positively achieved. The recognition step could also be performed using different hardware or software means adapted to the kind of visual code.

Figure 9:
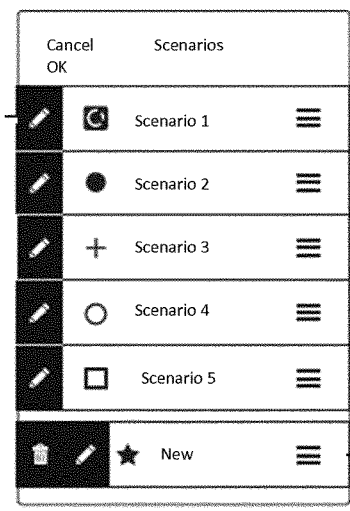

In FIG. 9, a list of possible scenarios is displayed. As previously explained, each scenario is identified by a pictogram. The user is invited to select a scenario and to set the different control commands of the selected scenario. Proposed scenarios can be automatically deduced from the preceding configuration steps. In particular, depending which remote controllers and/or peripheral devices have been recognized, a scenario can include the different options associated with the different remote controllers and/or peripheral devices channels in the system. The user may then only have to set the value of each option.

Figure 10:
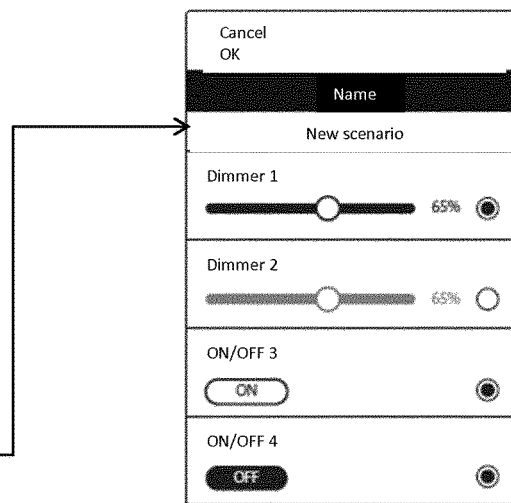

FIG. 10 shows an example of a scenario including the options linked to a first dimmer, to a second dimmer, to a first On/Off light switch and to a second On/Off light switch. Each option can be selected or discarded, and each value can be modified. It is also possible to change an On/Off light switch to a dimmer option, or to change other properties of peripheral devices channels.

The terminal 101 thus provides a screen listing the possible scenarios. Preferably, the first scenarios of the list are predefined, although they can be modified later on by the user. As the first five scenarios may be associated with the five active faces of a cubic remote controller, the configuration can be automatically done without any other user intervention. When several cubic remote controllers 105 are recognized in the system, they will all be assigned the same first five scenarios. They all exhibit the same symbols on the faces, corresponding to the pictograms of the first five scenarios of the list. Alternatively, a second different cube recognized in the system may be automatically associated with the next five scenarios of the list, and so on. In this case, this second cube exhibits preferably different symbols, which are identified in the scanned visual code, and which will be reproduced as pictograms for the automatically associated scenarios.

The same can apply to the different keypads, used as remote controllers 105, in that the available keys can be associated with scenarios configured from the terminal 101 in the order of the list. Thus, it is only necessary to configure the scenarios of the list on the terminal 101, and they are automatically and respectively assigned to the keys of the remote controllers 105 that have been recognized at the beginning of the configuration process.

Once the scenarios have been created or modified at wish (and the information shared within the system due to the constant synchronisation), the configuration process ends and the installation is ready to be used. The recognized objects of the installation will be able to communicate, send or execute control commands, in particular according to the configured scenarios.

Figure 11:
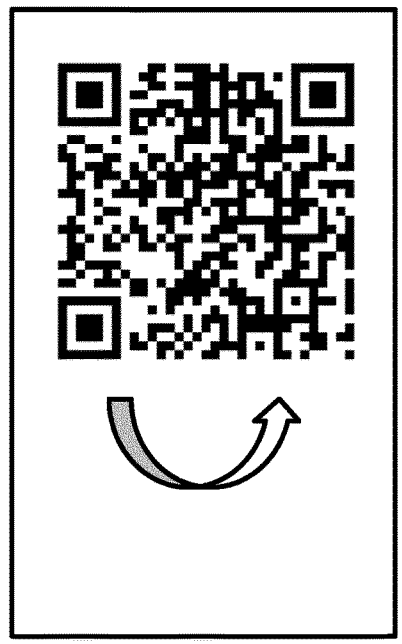

FIG. 11 shows a particular embodiment of the invention: a user may ask for the generation of an export visual code, at the end of the configuration process. This export code is displayed on the terminal screen so that it can be directly read by another terminal. It can also be sent using e-mail or shared onto social networks. The export QR code can also be used for backup. In other words, the process can comprise an exporting step wherein a visual code, including gathered information regarding the configuration of a first installation created using the terminal, is generated, said generated visual code being readable by another terminal for copying the created configuration information. As such, it is possible to create the configuration using the terminal of a first user in a building and simply duplicate the information for use using the terminal of a second user. Other means to transmit the information can also be used, for example NFC (Near Field Communication) or the local network and protocol.

The terminal 101 that can read the visual codes of peripheral devices and remote controllers, as well as an export code form another terminal 101 or any other source, is acting as a master in the installation.

More generally, the peripheral device(s) 104 and remote controller(s) 105 only learn the configuration items when instructed to do so. During the synchronisation with the terminal 101 and gateway 102, they are acting as slaves. The slaves are unable to modify the configuration information by themselves. In this case, the terminal 101 acts as a master and the gateway 102 also acts as a slave.

In order to achieve the process, the terminal 101, the gateway 102, the at least one remote controller 105 and the at least one peripheral device 104 are preferably all connected to a local network prior to the configuration step.

The invention is also linked to a residential automation system comprising a terminal 101, a gateway 102, at least one remote controller 105 and at least one peripheral device 104. The terminal 101, the gateway 102, the at least one remote controller 105 and the at least one peripheral device 104 are fitted with communication means to communicate with each other. The terminal 101 comprises hardware and software means to implement said process and more particularly to:

recognize and associate the gateway 102, the at least one remote controller 105 and the at least one peripheral device 104;

create configuration information comprising control commands involving the at least one peripheral device 104 and associated to the at least one remote controller 105;

share the configuration information with the gateway 102 and with the at least one peripheral device 104 involved as soon as it is created.

It is clear that each step of the process can be implemented on a corresponding element of the residential automation system.

The invention claimed is:

1. A process for configuring a residential automation system comprising a terminal, a gateway, at least one remote controller having at least one key, and at least one peripheral device,
wherein the process is executed using at least one processor and comprises a configuration action, performed by the terminal, the configuration action comprising:
recognizing the gateway, the at least one remote controller, and the at least one peripheral device;
associating the gateway, the at least one remote controller, and the at least one peripheral device;
creating a configuration information comprising a scenario having a set of control commands to the at least one associated peripheral device; and
sharing the configuration information with the associated gateway and with the at least one associated peripheral device;
wherein the terminal, the gateway, the at least one remote controller, and the at least one peripheral device are configured to communicate with each other, and
wherein the associated gateway and the at least one associated peripheral device are in constant synchronization with the terminal during at least a part of the configuration action,
wherein during the constant synchronization with the terminal, the following actions are performed:
awaiting messages from the gate the at least one associated peripheral device;
sending configuration information by the terminal to the associated gateway as soon as the configuration information is created, and
transmitting systematically any received information by the associated gateway from the terminal to the at least one associated peripheral device.

2. The process according to claim 1, wherein the constant synchronization is triggered during the recognizing or by a powering wherein the associated gateway is plugged into a source of energy.

3. The process according to claim 1, wherein the recognizing comprises gathering data related to the at least one associated peripheral device and the at least one associated remote controller,
wherein the data gathered during the recognizing comprises at least one selected from the group consisting of the following information:
type of the at least one associated peripheral device,
type of the at least one associated remote controller,
available keys for the at least one remote controller, and
channel options for the at least one peripheral device, wherein the configuration information is base on the data gathered during the recognizing.

4. The process according to claim 1, comprising:
an exporting action wherein a visual code including gathered information based on the created configuration information is generated, the generated visual code being readable by another terminal for copying the created configuration information.

5. The process according to claim 1,
wherein the terminal acts as a master, and
wherein the associated gateway, the at least one associated peripheral device, and the at least one associated remote controller act as slaves and are unable to modify the configuration information.

6. The process according to claim 1, wherein the terminal, the associated gateway, the at least one associated remote controller, and the at least one associated peripheral device are all connected to a local network prior to the configuration action.

7. The process according to claim 1, wherein the configuration information comprises at least one selected from the group consisting of a configuration of a key, a configuration of a channel, and further configuration of the scenario to the at least one associated peripheral device, wherein
the configuration of a key includes linking the scenario of the at least one associated peripheral device to a key of a remote controller,
the configuration of a channel includes changing a property of the at least one associated peripheral device upon receipt of the set of control command of the scenario, and
the further configuration of the scenario includes associating to the scenario the set of control commands to be sent to the at least one associated peripheral device or a set of channels of the at least one associated peripheral device.

8. The process according to claim 1, wherein the constant synchronization between the at least one associated peripheral device ends after the configuration action.

9. The process according to claim 1, wherein the created configuration information is automatically associated to the at least one remote controller,
wherein the configuration action comprises an automatic association between the at least one key and the created configuration information, and
wherein the automatic association is based on a predefined ranking of the configuration information in a list of configuration information.

10. The process according to claim 9, wherein the at least one remote controller has a form of a cube having faces, wherein each of a plurality of the faces is associated with a respective key, wherein each of the respective keys is automatically assigned to a corresponding configuration information in the predefined ranking of the list.

11. A process for configuring a residential automation system comprising a terminal, a gateway, at least one remote controller having at least one key, and at least one peripheral device,
wherein the process is executed using at least one processor and comprises a configuration action, performed by the terminal, the configuration action comprising:
recognizing the gateway, the at least one remote controller, and the at least one peripheral device;
associating the gateway, the at least one remote controller, and the at least one peripheral device;
creating a configuration information comprising a scenario having a set of control commands to the at least one associated peripheral device; and
sharing the configuration information with the associated gateway and with the at least one associated peripheral device;
wherein the terminal, the gateway, the at least one remote controller, and the at least one peripheral device are configured to communicate with each other,
wherein the associated gateway and the at least one associated peripheral device are in constant synchronization with the terminal during at least a part of the configuration action,
wherein the recognizing comprises gathering data related to the at least one associated peripheral device and the at least one associated remote controller, and
wherein the data gathered during the recognizing comprises at least one selected from the group consisting of the following information:
type of the at least one associated peripheral device,
type of the at least one associated remote controller,
available keys for the at least one remote controller, and
channel options for the at least one peripheral device.

12. The process according to claim 11, wherein the constant synchronization is triggered during the recognizing or by a powering wherein the associated gateway is plugged into a source of energy.

13. The process according to claim 11, wherein the configuration information is based on the data gathered during the recognizing.

14. The process according to claim 11, comprising:
an exporting action wherein a visual code including gathered information based on the created configuration information is generated, the generated visual code being readable by another terminal for copying the created configuration information.

15. The process according to claim 11,
wherein the terminal acts as a master, and
wherein the associated gateway, the at least one associated peripheral device, and the at least one associated remote controller act as slaves and are unable to modify the configuration information.

16. The process according to claim 11, wherein the terminal, the associated gateway, the at least one associated remote controller, and the at least one associated peripheral device are all connected to a local network prior to the configuration action.

17. The process according to claim 11, wherein the configuration information comprises at least one selected from the group consisting of a configuration of a key, a configuration of a channel, and a configuration of a scenario for the at least one associated peripheral device, wherein
the configuration of a key includes linking a scenario of a peripheral device to a key of a remote controller,
the configuration of a channel includes changing a property of a peripheral device upon receipt of a control command of a scenario, and
the configuration of a scenario includes associating to the scenario a set of control commands to be sent to a peripheral device or a set of channels of a peripheral device.

18. The process according to claim 11, wherein the constant synchronization between the at least one associated peripheral device ends after the configuration action.

19. The process according to claim 11, wherein the created configuration information is automatically associated to the at least one remote controller, wherein the configuration action comprises an automatic association between the at least one key and the created configuration information, and wherein the automatic association is based on a predefined ranking of the configuration information in a list of configuration information.

20. The process according to claim 19, wherein the at least one remote controller has a form of a cube having faces, wherein each of a plurality of the faces is associated with a respective key, wherein each of the respective keys is automatically assigned to a corresponding configuration information in the predefined ranking of the list.

21. A residential automation system comprising:
a terminal;
a gateway;
at least one remote controller; and
at least one peripheral device,
wherein the terminal, the gateway, the at least one remote controller, and the at least one peripheral device are configured to communicate with each other, and
wherein the terminal is further configured to implement, via at least one processor, a configuring process comprising a configuration action,
the configuration action comprising:
recognizing the gateway, the at least one remote controller, and the at least one peripheral device,
associating the gateway, the at least one remote controller, and the at least one peripheral device,
creating a configuration information comprising a scenario having a set of control commands to the at least one associated peripheral device, and
sharing the configuration information with the associated gateway and with the at least one associated peripheral device,
wherein the associated gateway and the at least one associated peripheral device are in constant synchronization with the terminal during at least a part of the configuration action, and
wherein during the constant synchronization with the terminal, the following actions are performed:
awaiting messages from the gateway by the at least one associated peripheral device;
sending configuration information by the terminal to the associated gateway as soon as the configuration information is created, and
transmitting systematically any received information by the associated gateway from the terminal to the at least one associated peripheral device.

22. The residential automation system according to claim 21, wherein the configuration information comprises at least one selected from the group consisting of a configuration of a key, a configuration of a channel, and a configuration of the scenario for the at least one associated peripheral device, and wherein
the configuration of a key includes linking the scenario of the at least one associated peripheral device to a key of a remote controller,
the configuration of a channel includes changing a property of the at least one associated peripheral device upon receipt of the set of control commands of the scenario, and
the configuration of a scenario includes associating to the scenario the set of control commands to be sent to the at least one associated peripheral device or a set of channels of the at least one associated peripheral device.

23. A residential automation system comprising:
a terminal;
a gateway;
at least one remote controller; and
at least one peripheral device,
wherein the terminal, the gateway, the at least one remote controller, and the at least one peripheral device are configured to communicate with each other, and
wherein the terminal is further configured to implement, via at least one processor, a configuring process comprising a configuration action,
the configuration action comprising:
recognizing the gateway, the at least one remote controller, and the at least one peripheral device,
associating the gateway, the at least one remote controller, and the at least one peripheral device,
creating a configuration information comprising a scenario having a set of control commands to the at least one associated peripheral device, and
sharing the configuration information with the associated gateway and with the at least one associated peripheral device, and
wherein the associated gateway and the at least one associated peripheral device are in constant synchronization with the terminal during at least a part of the configuration action,
wherein the associated gateway and the at least one associated peripheral device are in constant synchronization with the terminal during at least a part of the configuration action,
wherein the recognizing comprises gathering data related to the at least one associated peripheral device and the at least one associated remote controller, and
wherein the data gathered during the recognizing comprises at least one selected from the group consisting of the following information:
type of the at least one associated peripheral device,
type of the at least one associated remote controller,
available keys for the at least one remote controller, and
channel options for the at least one peripheral device.

24. The residential automation system according to claim 23, wherein
the configuration information comprises at least one selected from the group consisting of a configuration of a key, a configuration of a channel, and a configuration of the scenario for the at least one associated peripheral device,
the configuration of a key includes linking the scenario of the at least one associated peripheral device to a key of a remote controller,
the configuration of a channel includes changing a property of the at least one associated peripheral device upon receipt of the set of control commands of the scenario, and
the configuration of a scenario includes associating to the scenario the set of control commands to be sent to the at least one associated peripheral device or a set of channels of the at least one peripheral device.

* * * * *